US012624257B2

(12) United States Patent
Jetto et al.

(10) Patent No.: US 12,624,257 B2
(45) Date of Patent: May 12, 2026

(54) ADHESIVE PRIMER FOR FLEXOGRAPHIC PLATE MOUNTING TAPE

(71) Applicant: 3M INNOVATIVE PROPERTIES COMPANY, St. Paul, MN (US)

(72) Inventors: Becky A. Jetto, Jordan, MN (US); David T. Amos, St. Paul, MN (US); Jeffrey A. Peterson, Hugo, MN (US); Scott A. Van Wert, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1150 days.

(21) Appl. No.: 15/733,023

(22) PCT Filed: Nov. 1, 2018

(86) PCT No.: PCT/IB2018/058581
§ 371 (c)(1),
(2) Date: Apr. 21, 2020

(87) PCT Pub. No.: WO2019/092566
PCT Pub. Date: May 16, 2019

(65) Prior Publication Data
US 2020/0263061 A1 Aug. 20, 2020

Related U.S. Application Data
(60) Provisional application No. 62/582,978, filed on Nov. 8, 2017.

(51) Int. Cl.
*C08L 79/02* (2006.01)
*B41F 27/12* (2006.01)
(Continued)

(52) U.S. Cl.
CPC ............... *C09J 7/50* (2018.01); *C08K 5/0025* (2013.01); *C08K 5/34* (2013.01); *C08L 79/02* (2013.01);
(Continued)

(58) Field of Classification Search
None
See application file for complete search history.

(56) References Cited

U.S. PATENT DOCUMENTS 2,925,174 A * 2/1960 Stow ........................ C09J 7/385 427/412.5
5,156,904 A 10/1992 Rice
(Continued)

FOREIGN PATENT DOCUMENTS

JP 2004-285297 10/2004
JP 2018049946 A * 3/2018
(Continued)

OTHER PUBLICATIONS

Machine translation of JP 2018049946 A (Year: 2018).*
(Continued)

*Primary Examiner* — Frank D Ducheneaux
(74) *Attorney, Agent, or Firm* — Kathleen B. Gross; Melissa E. Buss

(57) ABSTRACT

Primer layers for adhesion of a pressure sensitive adhesive material to a substrate are provided. The primer layer comprises a crosslinked polymer. In some embodiments, the primer layer has an atomic nitrogen content of greater than 6 wt %, and in some a ratio of atomic weight percent of oxygen to nitrogen of less than 3.0. In some embodiments the crosslinked polymer is the reaction product of an amine-functional base polymer such as a polyethylenimine (PEI) and a crosslinker, which may be a polyaziridine crosslinker. Also provided are two-layer constructions comprising the
(Continued)

primer layer and a substrate layer; and tapes, such as flexographic plate mounting tapes, comprising the two-layer construction and a pressure sensitive adhesive layer.

20 Claims, 1 Drawing Sheet

(51) Int. Cl.

| | |
|---|---|
| ***C08K 5/00*** | (2006.01) |
| ***C08K 5/34*** | (2006.01) |
| ***C09J 7/25*** | (2018.01) |
| ***C09J 7/38*** | (2018.01) |
| ***C09J 7/50*** | (2018.01) |
| ***C09J 133/06*** | (2006.01) |
| ***C09J 133/08*** | (2006.01) |

(52) U.S. Cl.
CPC ............... *C09J 7/255* (2018.01); *C09J 7/385* (2018.01); *C09J 133/064* (2013.01); *C09J 133/08* (2013.01); *B41F 27/1275* (2013.01); *B41P 2200/12* (2013.01); *C09J 2301/124* (2020.08); *C09J 2301/302* (2020.08); *C09J 2433/00* (2013.01); *C09J 2467/006* (2013.01); *C09J 2479/023* (2013.01); *Y10T 428/2878* (2015.01)

(56) References Cited

U.S. PATENT DOCUMENTS

| | | | | |
|---|---|---|---|---|
| 5,662,985 | A * | 9/1997 | Jensen | G09F 3/10 428/355 R |
| 6,915,741 | B2 | 7/2005 | Price | |
| 8,152,944 | B2 | 4/2012 | Ellringmann | |
| 8,802,226 | B2 | 8/2014 | Eveson | |
| 8,962,777 | B2 | 2/2015 | Ellringmann | |
| 9,616,394 | B2 * | 4/2017 | Bothof | C09D 179/02 |
| 11,332,616 | B2 * | 5/2022 | Suzuki | C02F 1/56 |
| 2003/0049415 | A1 | 3/2003 | Pedginski | |
| 2006/0145127 | A1 | 7/2006 | Lockridge | |
| 2011/0019280 | A1 | 1/2011 | Lockridge | |
| 2011/0123717 | A1 * | 5/2011 | O'Leary | C08L 33/06 521/88 |
| 2013/0017765 | A1 * | 1/2013 | Coad | B24B 7/17 451/36 |
| 2015/0309383 | A1 * | 10/2015 | Taya | G02F 1/1525 359/275 |
| 2015/0361307 | A1 | 12/2015 | Van Wert | |
| 2018/0044556 | A1 * | 2/2018 | Yasui | C09J 133/06 |
| 2018/0247478 | A1 * | 8/2018 | Lee | B42D 25/324 |
| 2019/0219940 | A1 * | 7/2019 | Salant | G03G 7/00 |

FOREIGN PATENT DOCUMENTS

| | | | | |
|---|---|---|---|---|
| KR | 2006042224 A | * | 5/2006 | |
| WO | WO-2007111138 A1 | * | 10/2007 | C09D 133/26 |
| WO | WO2014-127341 | | 8/2014 | |

OTHER PUBLICATIONS

Machine translation of KR 2006042442 A (Year: 2006).*
Machine translation of WO 2007/111138 A1 (Year: 2007).*
Machine translation of JP-2004285297-A (Year: 2004).*
Wakabayashi, "Studies on s—Triazines. I. Contrimerization of Trichloroacetonitrile With Other Nitriles," Bulletin of the Chemical Society of Japan, 1969, vol. 42, pp. 2924-2930.
International Search Report for PCT International Application No. PCT/IB2018/058581, mailed on Feb. 4, 2019, 5 pages.

* cited by examiner

ADHESIVE PRIMER FOR FLEXOGRAPHIC PLATE MOUNTING TAPE

CROSS REFERENCE TO RELATED APPLICATIONS

This application is a national stage filing under 35 U.S.C. 371 of PCT/IB2018/058581, filed Nov. 1, 2018, which claims the benefit of U.S. Provisional Application No. 62/582,978, filed Nov. 8, 2017, the disclosure of which is incorporated by reference in its/their entirety herein.

FIELD OF THE DISCLOSURE

This disclosure relates to primers for bonding pressure sensitive adhesive (PSA) to a reinforcing film, such as may be used in a flexographic plate mounting tape, as well as flexographic plate mounting tapes incorporating this primer and methods of making and using such tapes.

BACKGROUND OF THE DISCLOSURE

Flexographic plate mounting tapes are used to mount flexographic printing plates to plate cylinders in a flexographic printing press. The following references may be relevant to the general field of technology of the present disclosure: U.S. 2006/0145127; U.S. Pat. Nos. 5,156,904; 6,915,741; 8,962,777; U.S. 2015/0361307; U.S. Pat. Nos. 8,152,944; 8,802,226; U.S. 2011/0019280.

U.S. Pat. No. 5,156,904 is titled "Polymeric Film Coated In-Line with Polyethyleneimine". A search of this document reveals that the terms "polyaziridine" and "polyaziridine crosslinker" do not appear in this reference, nor does the reference use the term "crosslink" in connection with polyethyleneimine.

SUMMARY OF THE DISCLOSURE

Briefly, the present disclosure provides primer layers for adhesion of a pressure sensitive adhesive material to a substrate, where the primer layer comprises a crosslinked polymer. In some embodiments, the primer layer has an atomic nitrogen content of greater than 6 wt %, greater than 8 wt %, greater than 10 wt %, greater than 12 wt %, greater than 14 wt %, or in some embodiments greater than 16 wt %. In some embodiments, the primer layer has a ratio of atomic weight percent of oxygen to nitrogen of less than 3.0, less than 2.5, less than 2.0, or in some embodiments less than 1.5. In some embodiments the crosslinked polymer comprises at least 50 wt % of the total weight of the primer layer, at least 60 wt %, at least 70 wt %, or in some embodiments at least 80 wt % of the total weight of the primer layer. In some embodiments the crosslinked polymer is the reaction product of a base polymer and a crosslinker or the reaction product of an amine-functional base polymer and a crosslinker. In some embodiments the crosslinker is a polyaziridine crosslinker. In some embodiments the polyaziridine crosslinker comprises two or more aziridine groups, in others three or more aziridine groups. In some embodiments the polyaziridine crosslinker is pentaerythritol tris (3-(1-aziridinyl) propionate). In some embodiments the amine-functional base polymer is a polyethylenimine (PEI). In some embodiments the primer layer additionally comprises inorganic filler which may be silica or fumed silica. Additional embodiments of the primer layers of the present disclosure are described below under "Selected Embodiments."

In another aspect, the present disclosure provides two-layer constructions comprising the primer layer according to the present disclosure and a substrate layer. In some embodiments, the substrate layer may comprise polyester polymers, polypropylene polymers, and/or polycarbonate polymers. In some embodiments the substrate layer comprises an oriented film. In some embodiments the two-layer construction is in the of a roll, optionally rolled upon itself without a liner. Additional embodiments of the two-layer constructions of the present disclosure are described below under "Selected Embodiments."

In another aspect, the present disclosure provides a tape, which may be a flexographic plate mounting tape, comprising the two-layer construction according to the present disclosure and a first pressure sensitive adhesive layer comprising a pressure sensitive adhesive material. In some embodiments, the pressure sensitive adhesive material comprises polyacrylate polymer, optionally comprising acidic polar monomer units, optionally monomer units derived from acrylic acid. In some embodiments the tape comprises a second pressure sensitive adhesive layer borne on a face of the tape opposite the first pressure sensitive adhesive layer. In some embodiments the tape comprises a foam layer. Additional embodiments of the tapes of the present disclosure are described below under "Selected Embodiments."

In another aspect, the present disclosure provides the use of the tape according to the present disclosure to adhere a flexographic printing plate to a plate cylinder of a flexographic printing press. Further, the present disclosure provides methods of mounting flexographic printing plates to plate cylinders in a flexographic printing press. Additional embodiments of methods of use of the present disclosure are described below under "Selected Embodiments."

In another aspect, the present disclosure provides methods of making two-layer constructions according to the present disclosure comprising the steps of: a) providing a substrate layer; and b) coating the substrate layer with a coating mixture comprising and amine-functional base polymer and a crosslinker. In some embodiments, methods additionally comprise the step of: c) reacting the crosslinker with the amine-functional base polymer so as to generate a primer layer comprising a crosslinked polymer, optionally by the application of heat. In some embodiments, step c) additionally comprises reacting the crosslinker with the substrate layer so as to form covalent bonds between the substrate layer and the primer layer. In some embodiments, methods additionally comprising the step of: d) orienting (stretching) the substrate layer. Step d) may be carried out after step b) and prior to or concurrently with step c). The present disclosure provides methods of making tapes according to the present disclosure which include the methods above and additionally comprising the step of: e) applying a pressure sensitive adhesive material to the primer layer to generate a first pressure sensitive adhesive layer. Additional embodiments of methods of manufacture of the present disclosure are described below under "Selected Embodiments."

In this application:

"directly bound" refers to two materials that are in direct contact with each other and bound together.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides a primer for bonding pressure sensitive adhesive (PSA) to the reinforcing film in a flexographic plate mounting tape. The present disclosure additionally provides flexographic plate mounting tapes incorporating this primer, and methods of making and using such tapes.

Flexographic plate mounting tapes are used to mount flexographic printing plates to plate cylinders in a flexographic printing press. Mounted flexographic printing plates may require washing between printing runs. The washing process may cause "nibs" of adhesive from the flexographic plate mounting tape to form. These small particles can compromise print quality by creating spots or flaws in the printed articles. Use of the primer according to the present disclosure provides reduced adhesive nib formation during in situ plate washing. Flexographic plate mounting tapes made with the subject primer demonstrate improved rub resistance, which results in reduced adhesive nib formation.

Figure 1:
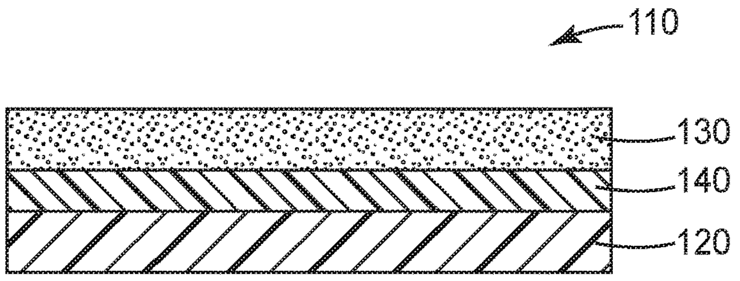
FIG. 1 is a cross-section of one embodiment of a flexographic plate mounting tape according to the present disclosure.

With reference to FIG. 1, one embodiment of flexographic plate mounting tape 110 according to the present disclosure includes carrier layer 120 and PSA layer 130 bound to carrier layer 120 through primer layer 140. In some embodiments, carrier layer 120 is immediately adjacent to and directly bound to primer layer 140. In some embodiments, primer layer 140 is immediately adjacent to and directly bound to PSA layer 130.

Figure 2:
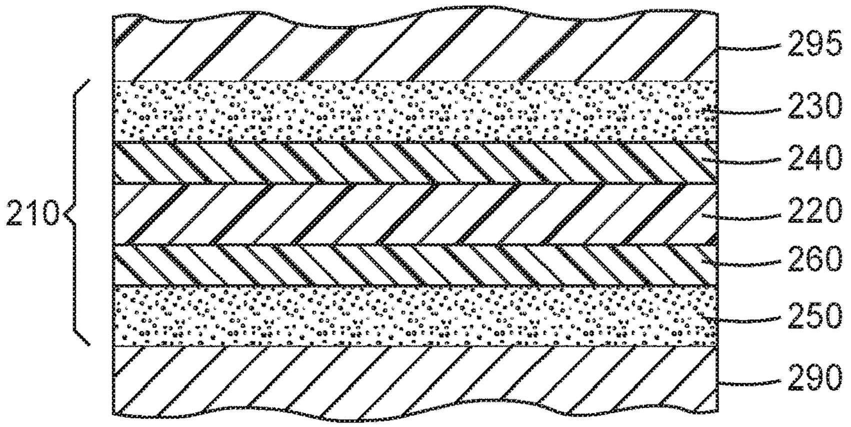
FIG. 2 is a cross-section of one embodiment of a flexographic plate mounting tape according to the present disclosure.

With reference to FIG. 2, a further embodiment of flexographic plate mounting tape 210 according to the present disclosure includes carrier layer 220, first PSA layer 230 bound to carrier layer 220 through first primer layer 240, and second PSA layer 250 bound to the opposite face of carrier layer 220 through second primer layer 260. In some embodiments, carrier layer 220 is immediately adjacent to and directly bound to first primer layer 240. In some embodiments, first primer layer 240 is immediately adjacent to and directly bound to first PSA layer 230. In some embodiments, carrier layer 220 is immediately adjacent to and directly bound to second primer layer 260. In some embodiments, second primer layer 260 is immediately adjacent to and directly bound to second PSA layer 250. In some embodiments, first PSA layer 230 and second PSA layer 250 have the same composition. In some embodiments, first PSA layer 230 and second PSA layer 250 differ in composition. In some embodiments, first primer layer 240 and second primer layer 260 have the same composition. In some embodiments, first primer layer 240 and second primer layer 260 differ in composition. In some applications flexographic plate mounting tape 210, flexographic printing plate 295 is attached to plate cylinder 290 of a flexographic printing press (not shown) by use of flexographic plate mounting tape 210. Typically flexographic plate mounting tape 210 is bound to flexographic printing plate 295 through first PSA layer 230 and bound to plate cylinder 290 through second PSA layer 250.

Figure 3:
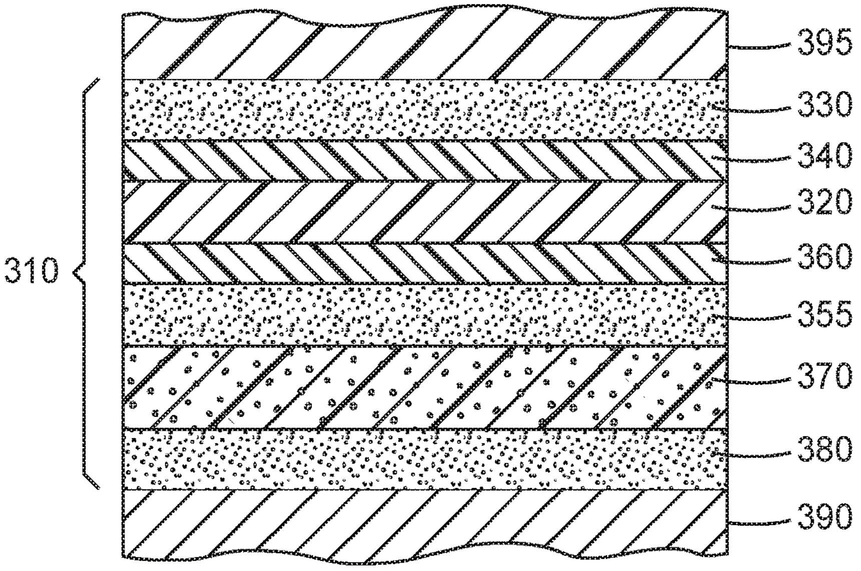
FIG. 3 is a cross-section of one embodiment of a flexographic plate mounting tape according to the present disclosure.

With reference to FIG. 3, a further embodiment of flexographic plate mounting tape 310 according to the present disclosure includes carrier layer 320, first PSA layer 330 bound to carrier layer 320 through first primer layer 340. In some embodiments, carrier layer 320 is immediately adjacent to and directly bound to first primer layer 340. In some embodiments, first primer layer 340 is immediately adjacent to and directly bound to first PSA layer 330. Foam layer 370 is bound to carrier layer 320, optionally through second primer layer 360 and internal adhesive layer 355. In some embodiments, foam layer 370 is immediately adjacent to and directly bound to carrier layer 320. In some embodiments, foam layer 370 is immediately adjacent to and directly bound to internal adhesive layer 355 and internal adhesive layer 355 is immediately adjacent to and directly bound to carrier layer 320. In some embodiments, foam layer 370 is immediately adjacent to and directly bound to internal adhesive layer 355, internal adhesive layer 355 is immediately adjacent to and directly bound to second primer layer 360, and second primer layer 360 is immediately adjacent to and directly bound to carrier layer 320. In some embodiments, second primer layer 360 is omitted and internal adhesive layer 355 is immediately adjacent to and directly bound to carrier layer 320. In some embodiments, foam layer 370 bears one or more additional adhesive layers 380. In some embodiments, additional adhesive layers 380 include additional PSA layers. In some embodiments, additional adhesive layers 380 include additional hot melt adhesive layers. In some applications flexographic plate mounting tape 310, flexographic printing plate 395 is attached to plate cylinder 390 of a flexographic printing press (not shown) by use of flexographic plate mounting tape 310. Typically flexographic plate mounting tape 310 is bound to flexographic printing plate 395 through first PSA layer 330 and bound to plate cylinder 390 through additional adhesive layer 380.

With regard to all of the embodiments of FIGS. 1-3, outer adhesive layers (such as PSA layer 130, first PSA layer 230, second PSA layer 250, first PSA layer 330, and additional adhesive layer(s) 380) may comprise relief features in their outer surface (not shown). With regard to all of the embodiments of FIGS. 1-3, outer adhesive layers (such as PSA layer 130, first PSA layer 230, second PSA layer 250, PSA layer 330, and additional adhesive layer(s) 380) may bear a release liner (not shown). In some such embodiments, the release liner has an embossed surface facing the adhesive layer which imparts and/or matches relief features in the outer surface of the PSA layer.

In some embodiments of the articles depicted in FIGS. 1-3, PSA layer 130, first PSA layer 230 and first PSA layer 330 have a thickness of at least 15 micrometers, in some embodiments at least 20 micrometers, and in some embodiments at least 30 micrometers. In some such embodiments those PSA layers have thickness of less than 200 micrometers, in some less than 100 micrometers, and in some less than 70 micrometers. In some embodiments, other adhesive layers are subject to the same constraints on thickness. In some embodiments of the articles depicted in FIGS. 1-3, primer layer 140, first primer layer 240 and first primer layer 340 have thickness of at least 40 nanometers, in some embodiments at least 80 nanometers, and in some embodiments at least 120 nanometers. In some such embodiments those primer layers have thickness of less than 500 nanometers, in some less than 350 nanometers, and in some less than 200 nanometers. In some embodiments, other primer layers are subject to the same constraints on thickness. In some embodiments of the articles depicted in FIGS. 1-3, carrier layers 120, 220 and 320 have a thickness of at least 10 micrometers, in some embodiments at least 15 micrometers, and in some embodiments at least 20 micrometers. In some such embodiments those carrier layers have thickness of less than 120 micrometers, in some less than 80 micrometers, and in some less than 40 micrometers. In some embodiments of the article depicted in FIGS. 3, foam layer 370 has a thickness of at least 200 micrometers, in some embodiments at least 300 micrometers, and in some embodiments at least 400 micrometers. In some such embodiments foam layer 370 has a thickness of less than 2500 micrometers, in some less than 2000 micrometers, and in some less than 1500 micrometers.

In some embodiments, the primer layer comprises a crosslinked polymer and has an atomic nitrogen content of greater than 6 wt %, in some embodiments greater than 8 wt %, in some greater than 10 wt %, in some greater than 12 wt %, in some greater than 14 wt %, and in some greater than 16 wt %. In some embodiments, the primer layer has a ratio of atomic weight percent of oxygen to nitrogen of less than 3.0, in some less than 2.5, in some less than 2.0 and in some less than 1.5. In some embodiments, the crosslinked polymer comprises at least 50 wt % of the total weight of the primer layer, in some at least 60 wt %, in some at least 70 wt %, and in some at least 80 wt %. The crosslinked polymer is the reaction product of a base polymer and a crosslinker, in some embodiments the reaction product of an amine-functional base polymer and a crosslinker. In some embodiments the amine-functional base polymer is a polyethylenimine (PEI). In some embodiments the crosslinker is a polyaziridine crosslinker.

A polyethylenimine (PEI) is a polymer comprising repeating units according to the formulas:

$$-CH_2CH_2-NH- \quad \text{or} \quad -CH_2CH_2-\overset{|}{N}-$$

The amine nitrogen may be secondary, in linear segments of the polymer, or may be tertiary, to form branch points. PEI's may include primary amine end groups. Linear PEI's contain all secondary amines, excluding primary amine end groups. Branched PEI's contain secondary and tertiary amine groups, as well as primary amine end groups. Totally branched dendrimeric forms are also reported. PEI's are sometimes referred to as polyaziridine polymers, since they may be composed of monomer units derived from aziridine monomers.

The term "polyaziridine" is used differently in the context of polyaziridine crosslinkers. Unlike polyaziridine polymers, polyaziridine crosslinkers comprise two or more live aziridine functional groups capable of reacting to form covalent bonds. In some embodiments, polyaziridine crosslinkers may form covalent bonds to amine groups of polyaziridine polymers. In some embodiments, polyaziridine crosslinkers may form covalent bonds to other polymers, such as to end groups of polyurethane or polyester polymers.

In some embodiments, the crosslinker is a polyaziridine crosslinker comprising two or more aziridine groups and in some three or more aziridine groups. In some embodiments the crosslinker is pentaerythritol tris (3-(1-aziridinyl) propionate).

The primer may be applied to the carrier as a mixture of base polymer and crosslinker. The primer may be applied to the carrier as a solution or suspension in aqueous solvent. The primer may be applied to the carrier by any suitable method, including spraying, coating, brushing, immersion, and the like. After application, the primer may be heated to accelerate crosslinking of the primer and/or formation of covalent bonds between the polyaziridine crosslinkers of the primer and the polymer comprising the carrier.

In some embodiments, the present primer may be applied to a carrier and stored for long periods before application of adhesive, rather than requiring prompt application of adhesive. This characteristic allows greater flexibility in manufacture.

Without wishing to be bound by theory, it is believed that this characteristic results from the condition that the reactive groups of the primer are involved in binding to the carrier, but are not involved in binding to the adhesive, and thus do not need to be kept "live" or "active" until adhesive can be applied. In contrast, other priming methods require immediate application of PSA to the primer for adequate adhesion, or application within minutes or hours. Furthermore, in some embodiments of the present disclosure, a primed carrier may be stored in roll form without undue adhesion of the primer to the backside of the carrier, even without a liner.

In some embodiments, the primer layer additionally comprises fillers. Any suitable fillers may be used, including silica particles such as fumed silica and the like.

The carrier layer may comprises any suitable polymeric material. In some embodiments, the carrier layer comprises a polyester polymer, a polypropylene polymer, or a polycarbonate polymer. In some embodiments, the carrier layer comprises a polyester polymer. In some embodiments, the carrier layer comprises polyethylene terephthalate (PET). In some embodiments, the carrier layer is an oriented (stretched) film. In some embodiments, the carrier layer is oriented (stretched) on at least one axis prior to application of primer. In some embodiments, the carrier layer is oriented (stretched) on two axes prior to application of primer. In some embodiments, the carrier layer is oriented (stretched) on at least one axis after application of primer. This may aid in penetration of the primer into the carrier. In some embodiments, the carrier layer is oriented (stretched) on two axes after application of primer. In some embodiments, such as demonstrated in the Examples below, the carrier layer is oriented (stretched) on one axis prior to application of primer and oriented (stretched) on a second axis after application of primer.

In some embodiments, the carrier layer additionally comprises fillers. In some embodiments, fillers act as slip additives by creating a microtextured film surface. Any suitable fillers may be used, including clays, aluminum silicate and the like.

Any suitable PSA layers may be used. In some embodiments, the PSA comprises a polyacrylate polymer. In some embodiments, the PSA comprises a tackified polyacrylate. In some embodiments, the PSA comprises a polyacrylate polymer comprising units derived from ionic monomers in an amount of 0.1-20.0 wt % of the total weight of the polyacrylate polymer, in some embodiments 0.5-10.0 wt %, and in some embodiments 3.0-10.0 wt %. In some embodiments, the PSA comprises a polyacrylate polymer comprising units derived from acrylic acid monomers in an amount of 0.1-10.0 wt % of the total weight of the polyacrylate polymer, in some embodiments 0.5-10.0 wt %, and in some embodiments 3.0-10.0 wt %. In some embodiments, the PSA comprises a tackified rubber. In some embodiments, the PSA comprises a tackified natural rubber. In some embodiments, the PSA comprises a tackified synthetic rubber. In some embodiments comprising multiple PSA layers, all PSA layers are of the same composition. In some embodiments comprising multiple PSA layers, PSA layers differ in composition.

Flexographic printing plates may be of any suitable material. In some embodiments, flexographic printing plates comprise polymeric materials, which in some embodiments are one or more polyesters.

Flexographic printing press plate cylinders may be of any suitable material. In some embodiments, flexographic printing press plate cylinders comprise polymeric materials, which in some embodiments are one or more polyurethanes. In some embodiments, flexographic printing press plate cylinders comprise metal materials, which in some embodiments are steel.

Selected Embodiments

The following embodiments, designated by letter and number, are intended to further illustrate the present disclosure but should not be construed to unduly limit this disclosure.

PN1. A primer layer for adhesion of a pressure sensitive adhesive material to a substrate, the primer layer comprising a crosslinked polymer and having an atomic nitrogen content of greater than 6 wt %.

PN2. The primer layer according to any of the preceding embodiments having an atomic nitrogen content of greater than 8 wt %.

PN3. The primer layer according to any of the preceding embodiments having an atomic nitrogen content of greater than 10 wt %.

PN4. The primer layer according to any of the preceding embodiments having an atomic nitrogen content of greater than 12 wt %.

PNS. The primer layer according to any of the preceding embodiments having an atomic nitrogen content of greater than 14 wt %.

PN6. The primer layer according to any of the preceding embodiments having an atomic nitrogen content of greater than 16 wt %.

PN7. The primer layer according to any of the preceding embodiments having a ratio of atomic weight percent of oxygen to nitrogen of less than 3.0.

PN8. The primer layer according to any of the preceding embodiments having a ratio of atomic weight percent of oxygen to nitrogen of less than 2.5.

PN9. The primer layer according to any of the preceding embodiments having a ratio of atomic weight percent of oxygen to nitrogen of less than 2.0.

PN10. The primer layer according to any of the preceding embodiments having a ratio of atomic weight percent of oxygen to nitrogen of less than 1.5.

PN11. The primer layer according to any of the preceding embodiments wherein the crosslinked polymer comprises at least 50 wt % of the total weight of the primer layer.

PN12. The primer layer according to any of the preceding embodiments wherein the crosslinked polymer comprises at least 60 wt % of the total weight of the primer layer.

PN13. The primer layer according to any of the preceding embodiments wherein the crosslinked polymer comprises at least 70 wt % of the total weight of the primer layer.

PN14. The primer layer according to any of the preceding embodiments wherein the crosslinked polymer comprises at least 80 wt % of the total weight of the primer layer.

PN15. The primer layer according to any of the preceding embodiments wherein the crosslinked polymer is the reaction product of a base polymer and a crosslinker.

PN16. The primer layer according to embodiment PN15 wherein the crosslinked polymer is the reaction product of an amine-functional base polymer and a crosslinker.

PN17. The primer layer according to embodiment PN16 wherein the crosslinker is a polyaziridine crosslinker.

PP1. A primer layer for adhesion of a pressure sensitive adhesive material to a substrate, the primer layer comprising a crosslinked polymer which is the reaction product of an amine-functional base polymer and a polyaziridine crosslinker.

PP2. The primer layer according to embodiment PN17 or PP1 wherein the polyaziridine crosslinker comprises two or more aziridine groups.

PP3. The primer layer according to embodiment PN17 or PP1 wherein the polyaziridine crosslinker comprises three or more aziridine groups.

PP4. The primer layer according to embodiment PN17 or PP1 wherein the polyaziridine crosslinker is pentaerythritol tris (3-(1-aziridinyl) propionate).

PP5. The primer layer according to any of embodiments PN17 or PP1-PP4 wherein the amine-functional base polymer is a polyethylenimine (PEI).

PF1. The primer layer according to any of embodiments PN1-PN17 or PP1-PP5 additionally comprising 0.1-40.0 wt % inorganic filler.

PF2. The primer layer according to any of embodiments PN1-PN17 or PP1-PP5 additionally comprising 2.0-20.0 wt % inorganic filler.

PF3. The primer layer according to embodiment PF1 or PF2 wherein the inorganic filler comprises silica.

PF4. The primer layer according to embodiment PF1 or PF2 wherein the inorganic filler comprises fumed silica.

TL1. A two-layer construction comprising the primer layer according to any of embodiments PN1-PN17, PP1-PP5 or PF1-PF4 and a substrate layer.

TL2. The two-layer construction according to embodiment TL1 wherein the primer layer is immediately adjacent to the substrate layer.

TL3. The two-layer construction according to embodiment TL1 wherein the primer layer is immediately adjacent to and directly bound to the substrate layer.

TL4. The two-layer construction according to embodiment TL1 wherein the primer layer is immediately adjacent to and directly bound to the substrate layer by covalent bonds.

TL5. The two-layer construction according to any of embodiments TL1-TL4 wherein the substrate layer comprises one or more materials selected from the group consisting of polyester polymers, polypropylene polymers, and polycarbonate polymers.

TL6. The two-layer construction according to any of embodiments TL1-TL4 wherein the substrate layer comprises one or more polyester polymers.

TL7. The two-layer construction according to any of embodiments TL1-TL4 wherein the substrate layer comprises polyethylene terephthalate (PET).

TL8. The two-layer construction according to any of embodiments TL1-TL7 wherein the substrate layer comprises an oriented film.

R1. A roll of the two-layer construction according to any of embodiments TL1-TL8 rolled upon itself.

R2. A roll of the two-layer construction according to any of embodiments TL1-TL8 rolled upon itself without a liner.

TP1. A tape comprising the two-layer construction according to any of embodiments TL1-TL8 and a first pressure sensitive adhesive layer comprising a pressure sensitive adhesive material.

TP2. The tape according to embodiment TP1 which is a flexographic plate mounting tape for adhering a flexographic printing plate to a plate cylinder in a flexographic printing press.

TP3. The tape according to any of embodiments T1-T2 wherein the pressure sensitive adhesive material comprises polyacrylate polymer.

TP4. The tape according to any of embodiments T1-T3 wherein the pressure sensitive adhesive material comprises a polymer comprising acidic polar monomer units.

TP5. The tape according to any of embodiments T1-T4 wherein the pressure sensitive adhesive material comprises a polymer comprising monomer units derived from acrylic acid.

TP6. The tape according to any of embodiments TP1-TP5 wherein the pressure sensitive adhesive layer is immediately adjacent to the primer layer.

TP7. The tape according to any of embodiments TP1-TP5 wherein the pressure sensitive adhesive layer is immediately adjacent to and directly bound to the primer layer.

TP8. The tape according to any of embodiments TP1-TP7 additionally comprising a second pressure sensitive adhesive layer.

TP9. The tape according to any of embodiments TP1-TP7 additionally comprising a second pressure sensitive adhesive layer borne on a face of the tape opposite the first pressure sensitive adhesive layer.

TP10. The tape according to any of embodiments TP1-TP9 additionally comprising a foam layer.

TP11. The tape according to embodiment TP10 additionally comprising an internal adhesive layer binding the foam layer to the substrate layer.

U1. The use of the tape according to any of embodiments TP1-TP11 to adhere a flexographic printing plate to a plate cylinder of a flexographic printing press.

MU1. A method of mounting flexographic printing plates to plate cylinders in a flexographic printing press comprising the steps of:

a) providing a segment of tape according to any of embodiments TP1-TP11;

b) adhering the segment of tape to a flexographic printing plate;

c) adhering the flexographic printing plate to a plate cylinder of a flexographic printing press by adhering the segment of tape to the plate cylinder.

MU2. A method of mounting flexographic printing plates to plate cylinders in a flexographic printing press comprising the steps of:

a) providing a segment of tape according to any of embodiments TP1-TP11;

b) adhering the segment of tape to a plate cylinder of a flexographic printing press;

c) adhering the flexographic printing plate to the plate cylinder by adhering the segment of tape to the flexographic printing plate.

MM1. A method of making a two-layer construction according to any of embodiments TL1-TL8 comprising the steps of:

a) providing a substrate layer; and b) coating the substrate layer with a coating mixture comprising and amine-functional base polymer and a crosslinker.

MM2. The method according to embodiment MM1 additionally comprising the step of:

c) reacting the crosslinker with the amine-functional base polymer so as to generate a primer layer comprising a crosslinked polymer.

MM3. The method according to embodiment MM2 wherein step c) comprises application of heat.

MM4. The method according to embodiment MM2 or MM3 wherein step c) additionally comprises reacting the crosslinker with the substrate layer so as to form covalent bonds between the substrate layer and the primer layer.

MM5. The method according to any of embodiments MM2-MM4 additionally comprising the step of:

d) orienting (stretching) the substrate layer.

MM6. The method according to embodiment MM5 wherein step d) is carried out after step b) and prior to step c).

MM7. The method according to embodiment MM5 wherein step d) is carried out after step b) and concurrently with step c).

MMT1. A method of making a tape according to any of embodiments TP1-TP11 comprising the method according to any of embodiments MM2-MM7 and additionally comprising the step of:

e) applying a pressure sensitive adhesive material to the primer layer to generate a first pressure sensitive adhesive layer.

MMT2. The method according to embodiment MMT1 wherein step e) occurs at a time more than three days after step c).

MMT3. A method of making a tape according to any of embodiments TP1-TP11 comprising the steps of:

a) providing a two-layer construction according to any of embodiments TL1-TL8 b) applying a pressure sensitive adhesive material to the primer layer of the two-layer construction to generate a first pressure sensitive adhesive layer.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, WI, or may be synthesized by known methods.

| Materials | |
|---|---|
| Designation | Description |
| PEI | A branched polyethylene imine resin nominally comprising 35% primary amine, 35% secondary amine, and 30% tertiary amine, corresponding to an atomic content of 33 wt % N, 56 wt % C, 12 wt % H, which is a colorless or light yellow liquid having a molecular weight (Mw) of 1200 grams/mole, an amine value of 19 millimole/g (solids), a resin content of greater than 98%, and a viscosity of 3500 to 7500 milliPascal * seconds at 25° C., available under the trade designation EPOMIN SP-012 from Aceto Corporation, Port Washington, NY. One representative structure is: 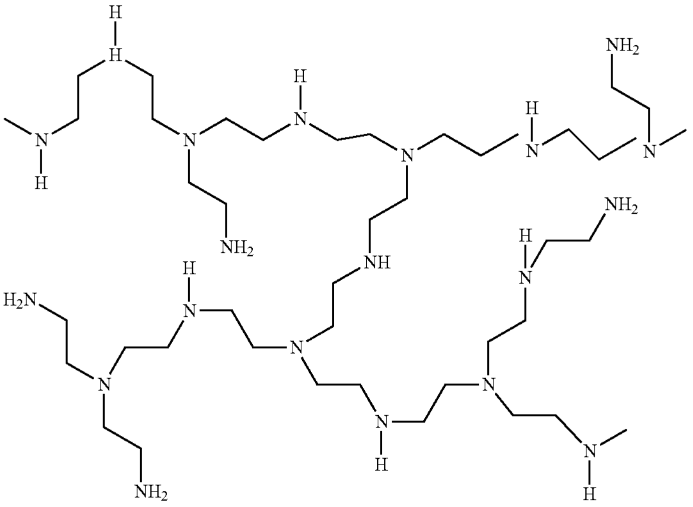 |
| PU | A water-borne aliphatic urethane dispersion, 33 percent solids, pH of 8.3, viscosity at 25° C., Brookfield 300 milliPascal * seconds, a weight per gallon at 25 C. of 8.8 pounds available under the trade designation NEOREZ R960 from Zeneca Resins, Wilmington, MA. |
| Acrylic Primer | A thermoset acrylic polymer containing a combination of acrylic latex and melamine/formaldehyde curing resin with triethyl amine that is a white, milky liquid with an acrylic or ammonia odor, a pH of 10.0, maximum Brookfield viscosity of 200 centipoise, a particle size of 90-130 nanometers, available under the trade designation RHOPLEX 3208 from The Dow Chemical Company, Midland, MI. |
| Crosslinker 1 | Pentaerythritol Tris (3-(1-Aziridinyl) Propionate), 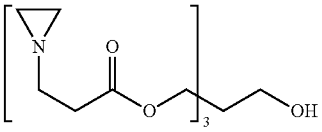 an ethylene imine based polyaziridine crosslinker with an aziridine content of 6.4-7.3 milliequivalents/gram, which is a slightly amber colored clear liquid having a density at 25° C. of 1.155-1.175 grams/milliliter and a viscosity at 25° C. less than 4000 centipoise, available under the trade name of PZ-33 POLYAZIRIDINE from Poly Aziridine, LLC, Medford, NJ. The molecular structure corresponds to an atomic content of 10 wt % N, 26 wt % O, 56 wt % C and 8 wt 2% H. |
| Crosslinker 2 | A methylated high imino melamine crosslinker supplied in butanol, a clear liquid with a dynamic viscosity of 5100-16000 milliPascal * seconds at 23° C., available under the trade designation CYMEL 327 from Allnex USA, Incorporated, Alpharetta, GA. This was diluted to 20 wt % with deionized water prior to use. |
| Polyester Primer | A film forming polyester polymer provided as an aqueous dispersion containing 33% polymers solids, available under the trade designation EASTEK 1100 POLYMER DISPERSION from Eastman Chemical Company, Kingsport, TN. |
| Silica | An aqueous dispersion of hydrophilic fumed silica, a milky-white liquid with a pH value between 9.0 and 10.0, a density at 20° C. of 1.16 grams per cubic centimeter, a SiO2 content of 25% to 27%, available under the trade designation AERODISP W-1226 from Evonik Degussa Corporation, Parsippany, NJ. |
| Surfactant | An ethoxylated, nonionic, linear alcohol surfactant having 8.9 EO groups/avg., a molecular weight of 597, and a hydroxyl number of 94 milligrams KOG/gram, available under the trade name TOMADOL T25-9 |

-continued

| Materials | |
|---|---|
| Designation | Description |
| | from Tomah Products, Milton, WI. This was diluted to 10 wt % with deionized water prior to use. |
| MX 150 | Acrylic particles having a crosslinked structure with an average particle size of 1.5 micrometers, available under the trade designation CHEMISNOW FUNCTIONAL FINE PARTICLES MX-150 from Soken Chemical & Engineering Company Ltd., Toshima-Ku, Tokyo. |
| Amine Catalyst | An amine blocked para-toluene sulfonic acid catalyst, a clear liquid having an active acid content of 20 weight %, available under the trade designation CYCAT 4045 from Cytec Industries, West Paterson, NJ. This was diluted to 10 wt % with deionized water prior to use. |
| IOA | Isooctyl acrylate, a colorless liquid containing 75-125 ppm monomethyl ether hydroquinone as inhibitor, >90 weight %, available from Sigma-Aldrich Co., LLC, St. Louis, MO. |
| AA | Acrylic acid, a colorless liquid, unsaturated carboxylic acid, available from Sigma-Aldrich Co., LLC, St. Louis, MO. |
| IBOA | Isobornyl acrylate, a colorless liquid, technical grade, containing 200 ppm monomethyl ether hydroquinone as inhibitor, available from Sigma-Aldrich Co., LLC, St. Louis, MO |
| Photoinitiator | 2,2-Dimethoxy-2-phenylacetophenone, a photoinitiator having a melting point between 64° C. and 67° C. and a molecular weight of 256.3 grams per mole, available under the trade designation OMNIRAD BDK from IGM Resins USA Incorporated, Charlotte, NC. |
| HDDA | Hexanediol diacrylate, available from Sigma-Aldrich Co., LLC, St. Louis, MO. |
| Triazine | 2,4-bis(trichloromethyl)-6-(3,4 dimethoxyphenyl)-s-triazine, made by the co-trimerization of an arylnitrile with trichloroacetonitrile in the presence of HCl gas and a Lewis acid such as AlCl3, AlBr3, etc., as described in Bulletin of the Chemical Society Japan, Volume 42, page 2924 (1969). |
| PET Film | Unoriented polyethylene terephthalate film having a thickness of a 0.021 inch (0.53 millimeter) and containing particulate aluminum silicate. |

Test Methods

Rub Resistance

Rub resistance was tested per ASTM D7835/D7835M-13: "Standard Test Method for Determining the Solvent Resistance of an Organic Coating using a Mechanical Rubbing Machine" with the following modifications. The mechanical finger, exerting a load of 900 grams and a stroke length of two inches (5.1 centimeters), was covered with four layers of dry cheese cloth.

The test specimens were prepared as follows. Samples of single sided pressure sensitive adhesive tape constructions, measuring 1 inch wide by 5 inches long (2.54 centimeters by 12.7 centimeters) and having a primer layer between the adhesive layer and the backing layer, were adhered to a stainless steel plate measuring 2 inches wide by 6 inches long (5.1 centimeters by 15.2 centimeters) using 3M CUSHION-MOUNT PLUS PLATE MOUNTING TAPE 1020R (3M Company, St. Paul, MN). The single sided tape was applied to the mounting tape such that the adhesive of the single sided tape was exposed. A solvent combination of 90:10 (w:w)/N-propanol:N-propyl acetate was then dripped onto the exposed adhesive surface in such a manner as to completely cover the adhesive surface.

The adhesive surface with solvent thereon was then covered with a microscope slide to prevent solvent evaporation. After one minute, the slide was removed and the adhesive surface was blotted dry using a tissue to remove any remaining solvent. The test specimen was immediately evaluated for its rub resistance using 25 double rubs of the mechanical finger. One rub consisted of one complete forward and backward motion over the exposed adhesive surface.

The rubbed sample was then visually evaluated for adhesive removal. The sample was rated as "pass" if the size of the area of completely exposed primer as evidenced by a shiny, non-sticky region is 50% or less of the total solvent soaked and rubbed area. The sample was rated as "fail" if the size of the area of completely exposed primer as evidenced by a shiny, non-sticky region is more than 50% of the total solvent soaked and rubbed area. One test specimen was evaluated for each Example and Comparative Example.

Nitrogen and Oxygen Content

The surfaces of the coated primers were examined using X-ray Photoelectron Spectroscopy (XPS), also known as Electron Spectroscopy for Chemical Analysis (ESCA), to determine the amounts of nitrogen and oxygen in the outermost 3 to 10 nanometers (nm) of the primer surface using the equipment and parameters listed in the table below.

| X-ray Photoelectron Spectroscopy (XPS) Analysis Equipment and Parameters | |
|---|---|
| Instrument | Model VERSAPROBE 5000 (Physical Electronics, Chanhassen, MN) |
| analysis areas | approximately 500 micrometers by 1500 micrometers |
| photoelectron take off angle | 45° ± 20° solid angle of acceptance |
| x-ray source | Monochromatic Aluminum K alpha (1486.6 electronVolts) |
| charge neutralization | Low energy $e^-$ and $Ar^+$ flood sources |
| charge correction | C—C/H→ 285.0 electronVolts |
| sputter ion gun conditions | None |
| analysis chamber pressure | ca. $5 \times 10^{-8}$ Torr |

Two sets of data were acquired for each Example and Comparative Example. The first set was measured on the primer surface of test specimens which had not been laminated to an adhesive transfer tape. The second set was measured on the primer surface of test specimens which had been laminated to an adhesive transfer tape and then had the adhesive layer removed by first grasping the adhesive with a tweezers and rolling it off, to remove the bulk adhesive. The adhesive remaining on the primer surface was sputtered with a gas cluster ion beam for 30 seconds, followed by negative ion time-of-flight secondary ion mass spectrometry (ToF-SIMS) analysis to check for an increase in the nitrogen signal accompanied by a decrease in the adhesive signal. The ToF-SIMS experimental conditions are given in the table below. This process of sputtering and running a negative ion SIMS was repeated until any residual amount of adhesive was minimized and PET began to be detected in the spectrum. At this point the exposed surface was analyzed for nitrogen content using X-ray Photoelectron Spectroscopy.

| ToF-SIMS experimental conditions | |
|---|---|
| Instrument | Model nanoTOF II (Physical Electronics, Chanhassen, MN) |
| Sputter source | 20 kiloVolt Ar2500+ (cluster size is approximate) |
| Sputter current | ~7 nanoAmperes |
| Sputter area | 2 mm × 2 mm |
| Ion source | 30 kiloVolt Bi3++ |
| Analysis area | 200 micrometers by 200 micrometers |
| Charge neutralization | Low energy electron source |
| Analysis chamber pressure | ca. 1 × $10^{-7}$ Torr |
| Secondary ion polarity | Negative |

Preparation of Primer Solutions

Examples 1A and 2A

Primer solutions 1A and 2A were prepared by mixing the components and amounts shown in Table 1 below in a glass four-ounce jar in the following order and times using a magnetic mixer and stir bar at a moderate rate: first deionized water was added to the jar, then PEI was slowly added and mixed for one minute, Next, Surfactant was added and mixed for 30 seconds. After adding and mixing the Surfactant, Silica was added and mixed for one minute then MX 150 with mixing for one minute, followed by addition of Crosslinker 1 was added slowly over a period of one minute followed by mixing for five minutes to provide primer solution 1A and 2A (at 13.5 wt % solids).

Comparative Example 1A

Primer solution Comparative 1A was prepared by mixing the following components and amounts in a glass four-ounce jar in the following order and times using a magnetic mixer and stir bar at a moderate rate: First deionized water was added to the jar followed by PU with mixing for one minute. Next, Surfactant was added and mixed for one minute followed by addition of Polyester Polymer Dispersion and mixing for one minute. Next, MX 150 was added and mixed for one minute. Finally, Crosslinker 1 was added and mixed for another five minutes to provide primer solution Comparative 1A (at 13 wt % solids).

Comparative Example 2A

Primer solution Comparative 2A was prepared by mixing the components and amounts shown in Table 1 below in a glass four-ounce jar in the following order and times using a magnetic mixer and stir bar at a moderate rate: first deionized water was added to the jar then the Acrylic Polymer with mixing for one minute. Next, Surfactant and MX 150 were added and mixed for one minute. This was followed by addition of Amine Catalyst and Crosslinker 2 with mixing for another five minutes to provide primer solution Comparative 2A (at 13 wt % solids).

TABLE 1

| Primer Solutions | | | | | | | | |
|---|---|---|---|---|---|---|---|---|
| Example | Deionized Water (grams) | PEI (grams) | Surfactant (grams) | Crosslinker (grams) | PU (grams) | Polyester Polymer Dispersion (grams) | Acrylic Polymer (grams) | Amine Catalyst (grams) |
| 1 A* | 40.6 | 5.5 | 0.25 | 1.0 | — | — | — | — |
| 2 A* | 40.6 | 4.2 | 0.25 | 2.3 | — | — | — | — |
| Comparative 1 A | 25.9 | — | 0.5 | 3.9 | 17.7 | 2.0 | — | — |
| Comparative 2 A | 27.0 | — | 0.5 | 3.3 | — | — | 18.6 | 0.6 |

*also contained Silica at a level of 10 wt % of the total solids.

All examples also contained MX 150 particles at a level of 0.1 wt % of the total solids.

Preparation of Primer Coated, Oriented Films

Examples 1B and 2B and Comparative Examples 1B and 2B

The resulting primer solutions 1A and 2A and Comparative 1A and 2A were used to make provide primer coated, oriented film samples of Examples 1B and 2B and Comparative Examples 1B and 2B, respectively. The primer solutions were coated onto mono-axially oriented PET film using a number 6 Meyer rod (RDS Specialties, Webster, NY), to provide a wet coating thickness of 8 micrometers, dried in a tenter oven for approximately 6 seconds between 100° C. and 110° C., followed by stretching four times the original sample size in the transverse (crossweb) direction using the following temperature zones and times: 1) approximately 6 seconds at a temperature between 100° C. and 110° C., 2) approximately 6 seconds at a temperature of 240° C., and 3) approximately 2 seconds at a temperature of 40° C. Next the coated, dried, oriented (stretched) films were wound up in a roll. Later, the coated/dried/stretched films were cut into rectangular shapes measuring approximately 12.7 centimeters by 25.4 centimeters (5 inches by 10 inches) to provide primer coated, oriented film samples of Examples 1B and 2B and Comparative Examples 1B and 2B.

Preparation of Pressure Sensitive Adhesive Transfer Tape

An adhesive precursor syrup was prepared by mixing 64.5 parts by weight (pbw) IOA, 8.5 pbw AA, 27 pbw IBOA, and 0.04 pbw Photoinitiator and partially polymerizing it under a nitrogen atmosphere by exposure to an ultraviolet radiation source having a spectral output from 300-400 nanometers with a maximum at 351 nanometers to provide a syrup having a viscosity of about 3 Pa*s (3000 centipoise) and a monomer conversion of about 8%. Next, 0.15 parts of Triazine, 0.175 parts of HDDA, and an additional 0.12 parts of Photoinitator were added to the syrup and fully dissolved to give the final coatable adhesive precursor syrup. This syrup was then knife coated onto the embossed side of a release liner and exposed to ultraviolet radiation by means of a series of lamps having a spectral output from 300-400 nanometers with at maximum at 351 nanometers in a nitrogen-rich atmosphere for a time of 105 seconds to provide a total dose of 510 milliJoules/square centimeter as measured using a calibrated NIST radiometer. An adhesive transfer tape having pressure sensitive adhesive (PSA) layer, approximately 0.002 inches (51 micrometers) thick, on the embossed surface of the release liner was thereby obtained. The adhesive transfer tape was stored at ambient conditions for two to three months prior to use.

Preparation of Adhesive Coated, Oriented Primed Films Examples 1C and 2C and Comparative Examples 1C and 2C Primer coated, oriented films, measuring approximately 12.7 centimeters by 25.4 centimeters (5 inches by 10 inches), were placed on a flat surface with the primer coated side facing up (exposed). The PSA adhesive transfer tape was laminated to the exposed primer surface, with its' adhesive surface in contact with the primer surface, by hand using a six inch diameter rubber roller and rolling back and forth two times. A construction having, in order, an oriented film, a primer coating, and adhesive layer, and an embossed liner was obtained. After removal of the liner the resulting tape articles were evaluated for rub resistance, and nitrogen and oxygen content as described in the test methods above. The results are shown in Table 2.

TABLE 2

| | Results | | | | | | |
|---|---|---|---|---|---|---|---|
| | Rub Resistance | Primed Only | | | Primed & Adhesive Removed | | |
| Ex. | (P/F) | % N | % O | % O/% N | % N | % O | % O/% N |
| 1C | P | 14.5 | 15.9 | 1.1 | 7.0 | 15.9 | 2.3 |
| 2C | P | 17.4 | 14.9 | 0.9 | 9.5 | 20.6 | 2.2 |
| CE 1C | F | 5.1 | 23.3 | 4.6 | 5.8 | 22.9 | 3.9 |
| CE 2C | F | 3.5 | 27.4 | 7.8 | 2.8 | 27.4 | 9.8 |

Atomic weight percent of nitrogen and oxygen for 1C and 2C represents the primer layer as applied, and was therefore lower than would be expected theoretically for the cross-linked polymer alone as these primers also included silica. In addition, for all four of 1C, 2C, CE1C and CE2C, atomic weight percent of nitrogen and oxygen was lower than would be expected for the polymer alone as the substrate includes aluminum silicate for surface roughness, and it is believed that peaks of aluminum silicate particles traverse the primer layer. Best results were found where the Atomic Weight percent of the Nitrogen was greater than 6% and the Ratio of Atomic weight percent of Oxygen to Nitrogen must be less than 3%.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A primer layer for adhesion of a pressure sensitive adhesive material to a substrate, the primer layer comprising a crosslinked polymer which is the reaction product of an amine-functional base polymer and a polyaziridine cross-linker, wherein the amine-functional base polymer is a branched polyethylenimine.

2. The primer layer according to claim 1, wherein the polyaziridine crosslinker is pentaerythritol tris (3-(1-aziridinyl) propionate).

3. A two-layer construction comprising the primer layer according to claim 1 immediately adjacent to and directly bound to a substrate layer.

4. The two-layer construction according to claim 3 wherein the substrate layer comprises one or more materials selected from the group consisting of polyester polymers, polypropylene polymers, and polycarbonate polymers.

5. The two-layer construction according to claim 3 wherein the substrate layer comprises one or more polyester polymers.

6. A tape comprising the two-layer construction according to claim 3 and a first pressure sensitive adhesive layer comprising a pressure sensitive adhesive material, wherein the pressure sensitive adhesive layer is immediately adjacent to and directly bound to the primer layer.

7. The tape according to claim 6 which is a flexographic plate mounting tape for adhering a flexographic printing plate to a plate cylinder in a flexographic printing press.

8. The tape according to claim 6 wherein the pressure sensitive adhesive material comprises a polyacrylate polymer comprising acidic polar monomer units.

9. The tape according to claim 6 additionally comprising a second pressure sensitive adhesive layer borne on a face of the tape opposite the first pressure sensitive adhesive layer.

10. The tape according to claim 6 adhered to a flexographic printing plate and a plate cylinder of a flexographic printing press.

11. A method of making a two-layer construction according to claim 3, the method comprising the steps of:

a) providing the substrate layer; and b) coating the substrate layer with a coating mixture comprising the amine-functional base polymer and the polyaziridine crosslinker.

12. The method according to claim 11 additionally comprising the step of:

c) reacting the polyaziridine crosslinker with the amine-functional base polymer so as to generate a primer layer comprising the crosslinked polymer.

13. The method according to claim 12 wherein step c) additionally comprises reacting the polyaziridine crosslinker with the substrate layer so as to form covalent bonds between the substrate layer and the primer layer.

14. The method according to claim 11 additionally comprising the step of:

d) stretching the substrate layer;

where step d) is carried out after step b).

15. A tape comprising a primer layer comprising a crosslinked polymer, which is the reaction product of a branched polyethylenimine and pentaerythritol tris (3-(1-aziridinyl) propionate), immediately adjacent to and directly bound to a substrate layer and a first pressure sensitive adhesive layer comprising a pressure sensitive adhesive material, wherein the pressure sensitive adhesive layer is immediately adjacent to and directly bound to the primer layer.

16. The tape according to claim 15 wherein the pressure sensitive adhesive material comprises a polyacrylate polymer comprising acrylic acid monomer units.

17. The tape according to claim 15, further comprising a second primer layer immediately adjacent to and directly bound to the substrate layer on a face opposite the first primer layer.

18. The tape according to claim 17, wherein the second primer layer comprises the crosslinked polymer which is the reaction product of a branched polyethylenimine and pentaerythritol tris (3-(1-aziridinyl) propionate).

19. The tape according to claim 17, wherein the primer layer and the second primer layer differ in composition.

20. The tape according to claim 17, further comprising a second pressure sensitive adhesive layer, wherein the second pressure sensitive adhesive layer is immediately adjacent to and directly bound to the second primer layer.

* * * * *